United States Patent [19]
Parker

[11] Patent Number: 5,596,903
[45] Date of Patent: Jan. 28, 1997

[54] ROTARY TO LINEAR ACTUATOR

[75] Inventor: Steven E. Parker, Tacoma, Wash.

[73] Assignee: Tuthill Corporation, Hinsdale, Ill.

[21] Appl. No.: 425,372

[22] Filed: Apr. 20, 1995

[51] Int. Cl.$^6$ .................................................. F16H 25/20
[52] U.S. Cl. ............................. 74/89; 74/89.15; 454/69
[58] Field of Search ..................... 74/89, 89.15, 127; 454/69

[56] References Cited

U.S. PATENT DOCUMENTS

| | | | |
|---|---|---|---|
| 508,219 | 11/1893 | Goodwin | 74/89.15 |
| 2,369,910 | 2/1945 | Morgan | 74/89.15 |
| 2,936,646 | 5/1960 | Gould | 74/459 |
| 3,364,757 | 1/1968 | Sears | 74/89.15 |
| 3,736,801 | 6/1973 | Bloom et al. | 74/89 |
| 4,229,983 | 10/1980 | Morita. | |
| 4,285,499 | 8/1981 | Zukausky. | |
| 4,544,083 | 10/1985 | Schroeder. | |
| 4,646,206 | 2/1987 | Bauer et al. | 454/69 X |
| 4,692,082 | 9/1987 | Smith. | |
| 4,922,768 | 5/1990 | Bruke. | |
| 4,984,477 | 1/1991 | Bruke | 74/89.15 |
| 5,065,667 | 11/1991 | Ziegler | 454/69 X |
| 5,079,967 | 1/1992 | LaCava. | |

OTHER PUBLICATIONS

Arens Controls Catalog listing of converter controls, pp. 7–8.

*Primary Examiner*—Charles A. Marmor
*Assistant Examiner*—Troy Grabow
*Attorney, Agent, or Firm*—Christensen O'Connor Johnson & Kindness PLLC

[57] ABSTRACT

An actuator for transforming rotary motion into linear motion includes a cylindrical tube (10) that has a rigid helix shaped ribbon (12) journalled within it for rotating movement about a longitudinal axis. A knob (20) is attached to one end of the ribbon and is used to impart a torque to the ribbon. A ribbon follower having first and second legs straddling the surfaces of the ribbon is mounted so that it extends through longitudinally formed slots 28 in the wall of said tube. As the knob is used to turn the ribbon, the ribbon follower moves up and down the length of the ribbon, riding on the exterior surfaces of the ribbon. An inner member (30), such as a control wire, is attached to the ribbon follower so that, as the ribbon is rotated, the inner member is carried by the ribbon follower in a linear path. Preferably, a stabilizing slider (40) overlies the ribbon and has slots cut in its walls through which the ribbon follower extends, the slider serving to control perpendicular motion of the ribbon follower.

11 Claims, 4 Drawing Sheets

5,596,903

ROTARY TO LINEAR ACTUATOR

FIELD OF THE INVENTION

This invention relates to control devices for transforming rotary motion into linear motion and, more particularly, to a manually rotatable actuator that translates and transfers linear motion through a linkage to a remotely coupled member.

BACKGROUND OF THE INVENTION

Push-pull type cables are often used to control mechanical devices on motor vehicles. For example, a vent flapper that swings between open and closed positions can be moved or adjusted by the linear movement of a push-pull control-type cable, rod or other linkage. In the case of a control cable, the cable is typically run from the vent flapper to the dashboard, where the end of the cable is accessible to the vehicle operator. A simple knob or handle is attached to the cable end so that the cable can be pulled or pushed to induce linear movement that in turn moves the vent flapper. Such an arrangement requires the handle to move a linear distance equal to the distance that the flapper is moved. Sometimes this can be a problem, due to the confined space available in a vehicle cab. Also, such an arrangement allows only a one-to-one ratio of the force required to move the cable and the force required to move the flapper. While such one-to-one ratio may be sufficient for a small vent flapper, it could be that the force requirement is too great if a vent flapper or other member of relatively large mass is to be controlled. Also, it is desirable to provide a control that can be designed to have a mechanical advantage that is either greater than, less than or equal to one, as required. Therefore, it is desirable to provide a control that can be used to translate a rotary input motion by the operator into a linear motion of a control cable, rod or other linkage, and visa versa.

SUMMARY OF THE INVENTION

In accordance with the above-stated concerns, the present invention provides an actuator for transforming rotary motion into linear motion. The actuator includes a cylindrical tube that has a rigid helix shaped ribbon journalled therein. The ribbon is journalled for rotating movement about a longitudinal axis. A knob is attached to a first end of the ribbon. The knob is used to accept an application of torque from an outside source, such as the hand of the vehicle operator. A ribbon follower is mounted on the ribbon so that the ribbon follower has first and second arms that straddle the ribbon. The ribbon follower interacts with the ribbon such that it moves up and down the ribbon as the ribbon rotates under the application of torque by the vehicle operator. One end of an output cable can be attached to the ribbon follower and the other end connected to a device, such as a vent flapper, that is to be moved by operation of the actuator.

In one embodiment, the rotary to linear actuator involves a slider that surrounds the ribbon and stabilizes the ribbon follower within the cylindrical tube.

BRIEF DESCRIPTION OF THE DRAWINGS

The objects and advantages of the present invention will be better understood by those of ordinary skill in the art and others upon reading the ensuing specification when taken in conjunction with the attached drawings, wherein.

DETAILED DESCRIPTION OF THE PREFERRED EMBODIMENT

Figure 1:
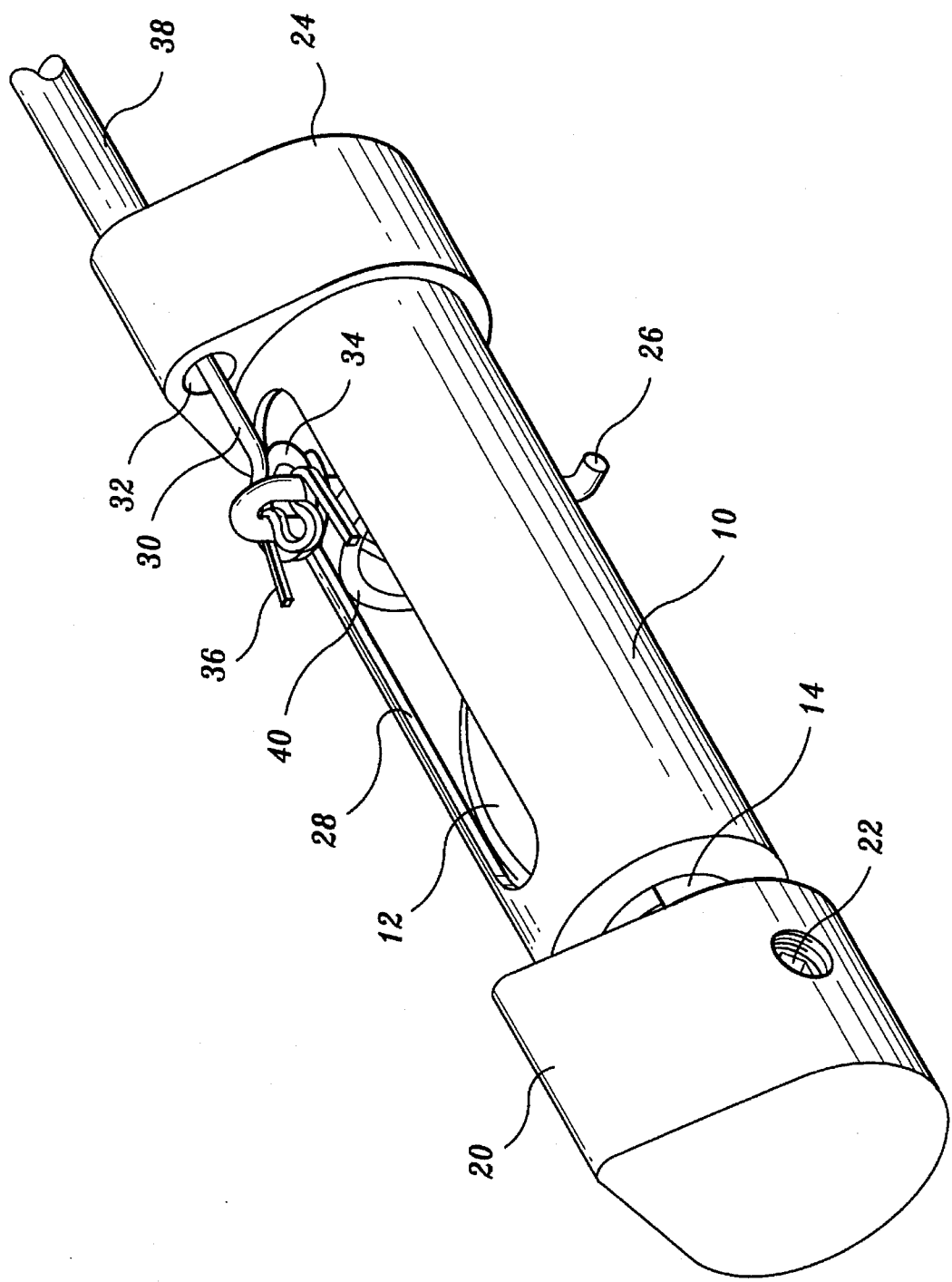
FIG. 1 is an isometric view of a preferred embodiment of a rotary to linear actuator made in accordance with the principles of the present invention.
Figure 2:
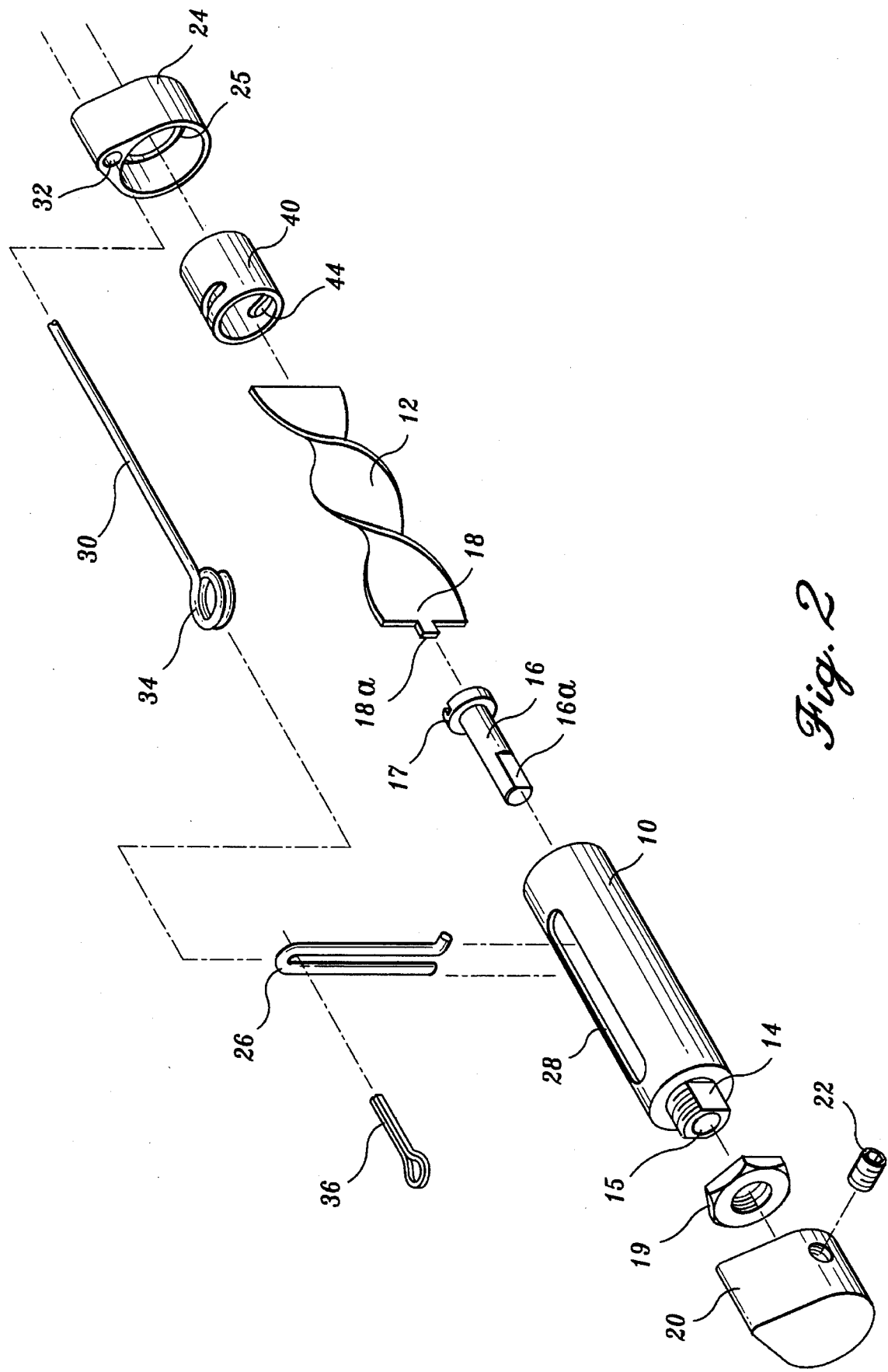
FIG. 2 is an exploded view of the actuator of FIG. 1.
Figure 3:
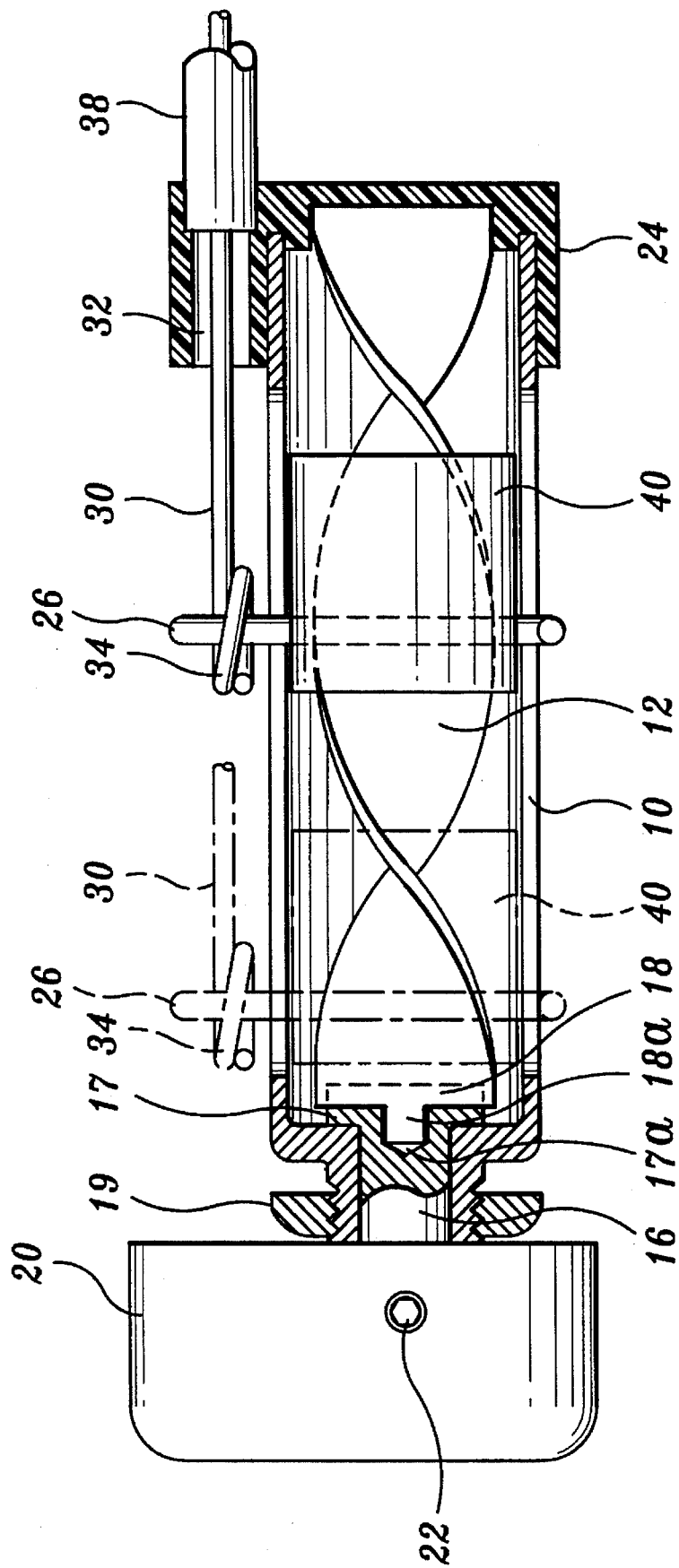
FIG. 3 is a side elevational view in cross section taken along the longitudinal axis of the actuator shown in FIG. 1.

A preferred embodiment of the rotary to linear actuator of the present invention is pictured in FIG. 1. FIG. 2 is an exploded view of the actuator of FIG. 1. Both FIGS. 1 and 2 will be referred to in describing the parts that make up the illustrated embodiment of the actuator of the present invention. A cylindrical tube 10 forms the main body of the actuator. The tube 10 contains a rigid helix shaped ribbon 12, which is free to rotate within the tube 10. The helix shaped ribbon 12 can be formed from a twisted elongated strip of a rigid material, such as steel or plastic. The first end of the tube 10 has a threaded mounting neck 14 extending therefrom. A hole 15 is formed in the mounting neck 14, and a drive shalt 16 is located within the tube 10 so that a first end of the drive shaft 16 protrudes through the hole 15 in the mounting neck 14. The second end of the drive shaft 16 within the tube 10 is formed with a disk shaped slotted head 17. As best seen in FIG. 3, a pilot hole 17a is formed centrally within the base of the slot in the head 17. A first end 18 of the helix shaped ribbon 12 defines a tab 18a. The edge of the end 18 of the ribbon 12 is inserted within the slot of head 17 of the drive shalt 16, with the tab 18a being received within the pilot hole 17a. The slotted head 17 thus indexes the end 18 of the ribbon 12, transmitting torque from the knob 20.

A nut 19 is threaded onto the neck 14 of the tube 10, to provide for mounting of the actuator on a dashboard or control panel. A knob 20 is slidably and nonrotatably mounted on the first protruding end of the drive shalt 16. The knob 20 may be suitably held in place by a set screw 22, which is threaded into the knob 20 so that it presses against a flat surface 16a in the drive shalt 16. However it will be readily apparent to those of ordinary skill in the art that many other methods can be used to secure the knob 20 in place, such as by using a spring retainer, a press fit, serrations, etc. The knob 20 is then used to rotate the shalt 16, which in turn rotates the rigid ribbon 12 due to the interaction between the slot and pilot hole 17a in the head 17 of the drive shalt 16, and the tab 18a and edge 18 of the ribbon 12. An end cap 24 is nonrotatably and longitudinally attached (such as by press fitting) on the second end of the tube 10, and has an annular bearing surface 25 formed in it that receives the second end of the ribbon 12. The ribbon 12 is therefore effectively journalled within the tube 10 for rotating movement with the drive shalt 16.

A ribbon follower 26, which is pictured in FIG. 2 as an inverted U, overlies the ribbon 12 so that the first and second arms of the ribbon follower 26 engage opposing surfaces of the ribbon 12. The top and bottom of the ribbon follower 26 extend from the tube 10 through elongated longitudinally oriented slots 28 formed in opposing orientation in the wall of the tube 10. An inner member 30 of a linear force transmitting linkage passes through a hole 32 formed in an extended portion of the end cap 24. In the embodiment illustrated, the inner member 30 is formed as a semi-flexible length of control wire. However, one of ordinary skill will appreciate that the inner member 30 could also suitably be formed as a cable, a rigid rod, or other linkage capable of transmitting longitudinal movement.

Referring to FIG. 2, the inner member 30 has a loop 34 formed at one end. The loop 34 is sized and oriented to fit over the upper closed end of the ribbon follower 26 so that, as the ribbon follower 26 moves back and forth in the tube 10, it carries with it the inner member 30. In the illustrated embodiment, a cotter pin 36 is used to keep the loop 34 of the inner member 30 in place on the ribbon follower 26; however, other suitable means could be used, as shall be described subsequently. The inner member 30 has an outer casing 38 surrounding it, one end of the outer casing 38 being attached to the end cap 24, such as by being press fit into the hole 32. The inner member 30 and outer casing 38 are shown in an abbreviated form in the drawings, and in actual practice would extend to whatever member, such as a vent flapper (not shown), the inner member 30 is intended to manipulate.

In the preferred embodiment illustrated, an annular slider 40 is provided. The slider 40 surrounds the ribbon 12 and has a pair of diametrically opposed, circumferentially oriented slots 44 formed in its wall. The ribbon follower 26 fits within the slots 44 and is held in a stable position (perpendicular to the longitudinal axis) by the slots 44. As the ribbon follower 26 moves up and down the ribbon 12, it carries with it the slider 40.

The operation of the invention can be best understood by viewing FIG. 3. The solid lines in FIG. 3 illustrate the actuator of the present invention in its configuration shown in FIG. 1 with the ribbon follower 26 positioned to the right end of the tube 10. It should be understood that the ribbon follower 26 can move in use fully from the right end to the left end of the tube 10, but the ribbon follower 26 is illustrated partway inward within the tube 10 for clarity to better show construction detail. As the knob 20 is turned counterclockwise, it causes the ribbon 12 to turn with it. The first and second arms of the ribbon follower 26 ride along the surfaces of the ribbon 12 to the broken chain-line position shown in FIG. 3. As the ribbon follower 26 moves to the broken chain-line position of FIG. 3, it pulls the inner member 30 longitudinally in the same direction, that is, to the left, as pictured, thereby carrying with it whatever member (not shown) is attached to the other end of the inner member 30. For example, a vent flapper or other member to be positioned by longitudinal movement, or to be pivoted on a hinge, can be secured to the other end of the inner member 30. When the knob 20 is turned in the opposite direction clockwise, the ribbon 12 turns in that same direction, and the ribbon follower 26 moves along the ribbon 12, pushing the inner member 30 back to the right-hand position, shown in solid line in FIG. 3.

Figure 4:
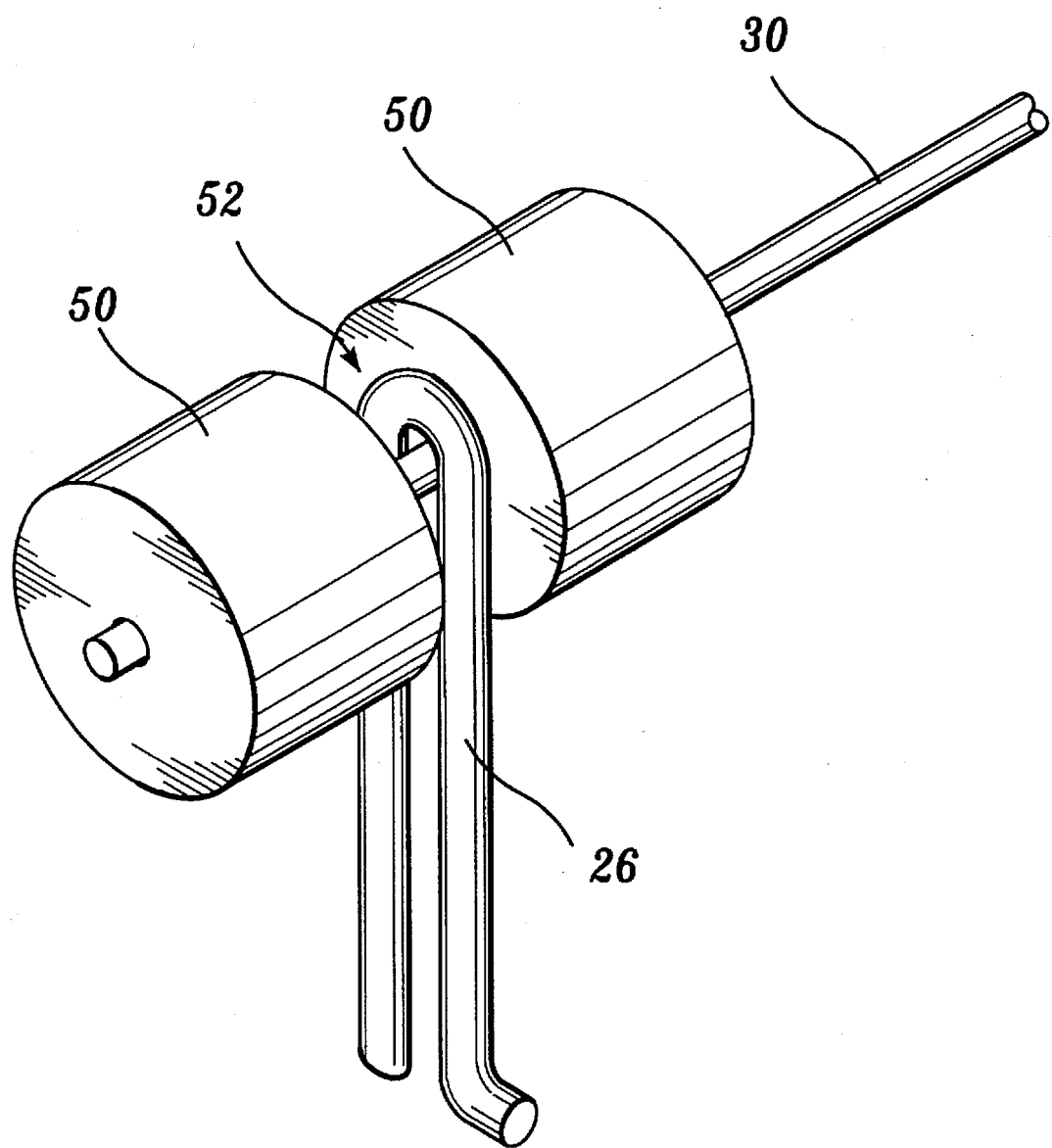
FIG. 4 is an isometric view of an alternative coupler for connecting the inner member of a control linkage to the ribbon follower of the actuator.

An alternate method of connecting the inner member 30 to the ribbon follower 26 is shown in FIG. 4. Rather than being formed into a loop 34, the end of the inner member 30 is provided with two cylindrical sleeves 50. Each sleeve is coaxially secured to the inner member 30. The sleeves 50 may be crimped onto the end of the inner member 30, formed in place, or secured by other methods known to those of ordinary skill in the art. A gap 52 is defined between the first and second sleeves 50. The ribbon follower 26 is received on the inner member 30 at the gap 52, and is captured between the sleeves 50. The use of sleeves 50 has the advantage of permitting the inner member 30 to axially rotate a full 360°.

It will be appreciated by those of ordinary skill in the art that the mechanical advantage gained by the use of the rigid helix shaped ribbon 12 can be altered by changing the lead of the helix, i.e., varying the lead angle or pitch of the helix, so that more turns are required of the knob in order to move the ribbon follower the same linear distance; and, in accordance with the law of simple machines, the mechanical advantage would be increased. Likewise, the lead of the helix can be increased to provide a less than one-to-one mechanical load advantage. The helix shaped ribbon 12 can also be formed with either a clockwise or counterclockwise twist, depending on the desired direction of rotation.

While the illustrated preferred embodiment uses the slider 40, it will also be understood that the ribbon follower 26 can operate without the presence of the slider 40. However, such operation would be subject to rough action and/or inefficient operation, since the slider 40 maintains the perpendicular orientation of the ribbon follower 26 to the longitudinal axis of the ribbon 12, as shown in FIG. 3, and keeps it moving smoothly along the surfaces of the ribbon 12. A given fit or clearance between the ribbon 12, the ribbon follower 26 and the slots 28 provide for a predetermined longitudinal backlash or lost motion. Also, once the geometry of the actuator is established, movement of the knob 20 a predetermined amount will always cause the same amount of motion in the inner member 30. Therefore, it is possible to index the position of the knob 20 in relation to the desired position of the controlled member, such as the vent flapper. The operator knows that, each time the knob 20 is in a particular position, the flapper is also in a related position. For example, if the knob 20 is indexed to the open and closed positions of the flapper during installation and setup, then each time the knob 20 is moved to the opened or closed position, it will coincide with the vent flapper actually being positioned in the open or closed position.

An actuator for translating rotary motion into linear motion has been described above. The actuator is useful as a means of operating a member, such as a vent flapper in a motor vehicle. Although the invention has been described in terms of its use in a motor vehicle, it should be apparent to those of ordinary skill and others that the invention can be used in any situation where rotary motion needs to be converted to linear motion of a control wire, control cable or other control linkage, and is useful in any type of vehicle, including aircraft, watercraft, trucks, buses, automobiles and machinery. Also, while the invention has been described for use in controlling a vent flapper, it could also be used for controlling other moving members. Finally, variations of the components of the actuator described above could be differently formed. For example, the ribbon 12 and shaft 16 could be integrally formed. The tube 10 could be loaded from the opposite end, or be formed as a split shell. Further, the ribbon follower 26 could be formed from an elongate member in which an opening or slot has been machined to receive the ribbon 12, with the side portions of the member serving as the arms of the ribbon follower 26. Lastly, it should be apparent to those of ordinary skill in the art that the actuator described above can be used not only to translate rotary motion to linear motion, but also to translate linear motion to rotary motion. Therefore, it should be remembered that, while a preferred embodiment of the invention has been illustrated and described, changes can be made to the illustrated embodiment while remaining within the scope of the invention. For these reasons, the invention should be defined solely with reference to the appended claims.

The embodiments of the invention in which an exclusive property or privilege is claimed are defined as follows:

1. An actuator for transforming rotary motion into linear motion, comprising:

a cylindrical tube having first and second ends;

a rigid, helix shaped ribbon having first and second ends, said helix shaped ribbon being journalled within said tube for rotating movement about a longitudinal axis;

a knob attached to a first end of said helix shaped ribbon to accept application of torque from an external source;

a ribbon follower mounted on said helix shaped ribbon, said ribbon follower having first and second parallel spaced arms straddling said helix shaped ribbon to receive said helix shaped ribbon therebetween, said ribbon follower mounted so as to move along the longitudinal axis of said helix shaped ribbon as said knob and helix shaped ribbon are rotated; and a flexible motion transmitting linkage attached to said ribbon follower.

2. The actuator of claim 1, wherein said tube includes an elongate slot formed in said tube parallel to said longitudinal axis of said helix shaped ribbon, said ribbon follower extending through said slot.

3. The actuator of claim 1, wherein said helix shaped ribbon is twisted into a helix such that the mechanical advantage between the torque input through the knob and a resulting force exerted on the motion transmitting linkage is greater than 1:1.

4. The actuator of claim 1, wherein said helix shaped ribbon is twisted into a helix such that the mechanical advantage between the torque input through the knob and a resulting force exerted on the motion transmitting linkage is less than 1:1.

5. The actuator of claim 1, further including a cylindrical end cap having an outer bore of a size approximately the same as the outer diameter of the tube, said end cap being non-rotatably and longitudinally secured on said second end of the tube, said end cap further having an inner bore of a size substantially the same as the outer diameter of said helix shaped ribbon, said second end of said helix shaped ribbon being mounted within said second bore, said second bore acting as a bearing surface for the second end of said helix shaped ribbon.

6. An actuator for transforming rotary motion into linear motion, comprising:

a cylindrical tube having first and second ends;

a rigid, helix shaped ribbon having first and second ends, said helix shaped ribbon being journalled within said tube for rotating movement about a longitudinal axis;

a knob attached to a first end of said helix shaped ribbon to accept application of torque from an external source a ribbon follower mounted on said helix shaped ribbon, said ribbon follower having first and second arms straddling said helix shaped ribbon, said ribbon follower mounted so as to move along the longitudinal axis of said helix shaped ribbon as said knob and helix shaped ribbon are rotated; and a motion transmitting linkage attached to said ribbon follower, wherein said tube includes an elongate slot formed in said tube parallel to said longitudinal axis of said helix shaped ribbon, said ribbon follower extending through said slot, further including a cylindrical slider surrounding said helix shaped ribbon and of a length substantially less than the total length of said helix shaped ribbon, said cylindrical slider including opposed circumferentially oriented slots formed in the wall of said slider, said helix shaped ribbon follower extending through said slots so that said slider stabilizes said ribbon follower during longitudinal movement along the length of said tube.

7. An actuator for transforming rotary motion into linear motion, comprising:

a cylindrical tube having first and second ends;

a rigid, helix shaped ribbon having first and second ends, said helix shaped ribbon being journalled within said tube for rotating movement about a longitudinal axis;

a knob attached to a first end of said helix shaped ribbon to accept application of torque from an external source;

a drive shaft extending from said first end of said tube, said knob being affixed to a first end of said drive shaft, the second end of said drive shaft having a head formed thereon, said head including a slot formed therein, said first end of said helix shaped ribbon loosely engaging slot in said head;

a ribbon follower mounted on said helix shaped ribbon, said ribbon follower having first and second arms straddling said helix shaped ribbon, said ribbon follower mounted so as to move along the longitudinal axis of said helix shaped ribbon as said knob and helix shaped ribbon are rotated; and a motion transmitting linkage attached to said ribbon follower.

8. The actuator of claim 7, wherein said first end of said helix shaped ribbon defines a tab, and slot in said head of said shaft defines a central pilot hole that receives tab.

9. An actuator for transforming rotary motion from a rotary force imparting member into linear motion transmitted to a flexible linear force transmitting member, said actuator comprising:

a cylindrical tube;

a rigid helix shaped ribbon journalled within said tube for rotating movement about a longitudinal axis, said ribbon having a first end coupled to the rotary force imparting member; and a ribbon follower mounted on said ribbon, said ribbon follower having first and second spaced parallel arm portions straddling said ribbon to receive said ribbon therebetween so that said ribbon follower moves along the longitudinal axis of said ribbon as the rotary force imparting member imparts rotary movement to said ribbon, said ribbon follower being coupled to the flexible linear force transmitting member to linearly advance and retract the coupled flexible linear force transmitting member as said ribbon follower moves longitudinally.

10. The actuator of claim 9, wherein the linear force transmitting member is coupled to a vent flap for adjustment of the vent flap position.

11. An actuator for transforming motion between a rotary force transmitting member and a flexible linear force transmitting member, comprising:

a cylindrical tube;

a rigid helix-shaped ribbon journalled within said tube for rotating movement about a longitudinal axis, said ribbon having a first end coupled to the rotary force transmitting member; and a ribbon follower mounted on said ribbon, said ribbon follower having first and second spaced parallel arm portions straddling said ribbon to receive said ribbon therebetween so that the ribbon follower moves along the longitudinal axis of said ribbon as the ribbon and rotary force transmitting member rotate, said ribbon follower being coupled to the flexible linear force transmitting member so that the flexible linear force transmitting member and ribbon follower cooperatively advance and retract longitudinally relative to said tube.

* * * * *